United States Patent Office 3,346,943
Patented Oct. 17, 1967

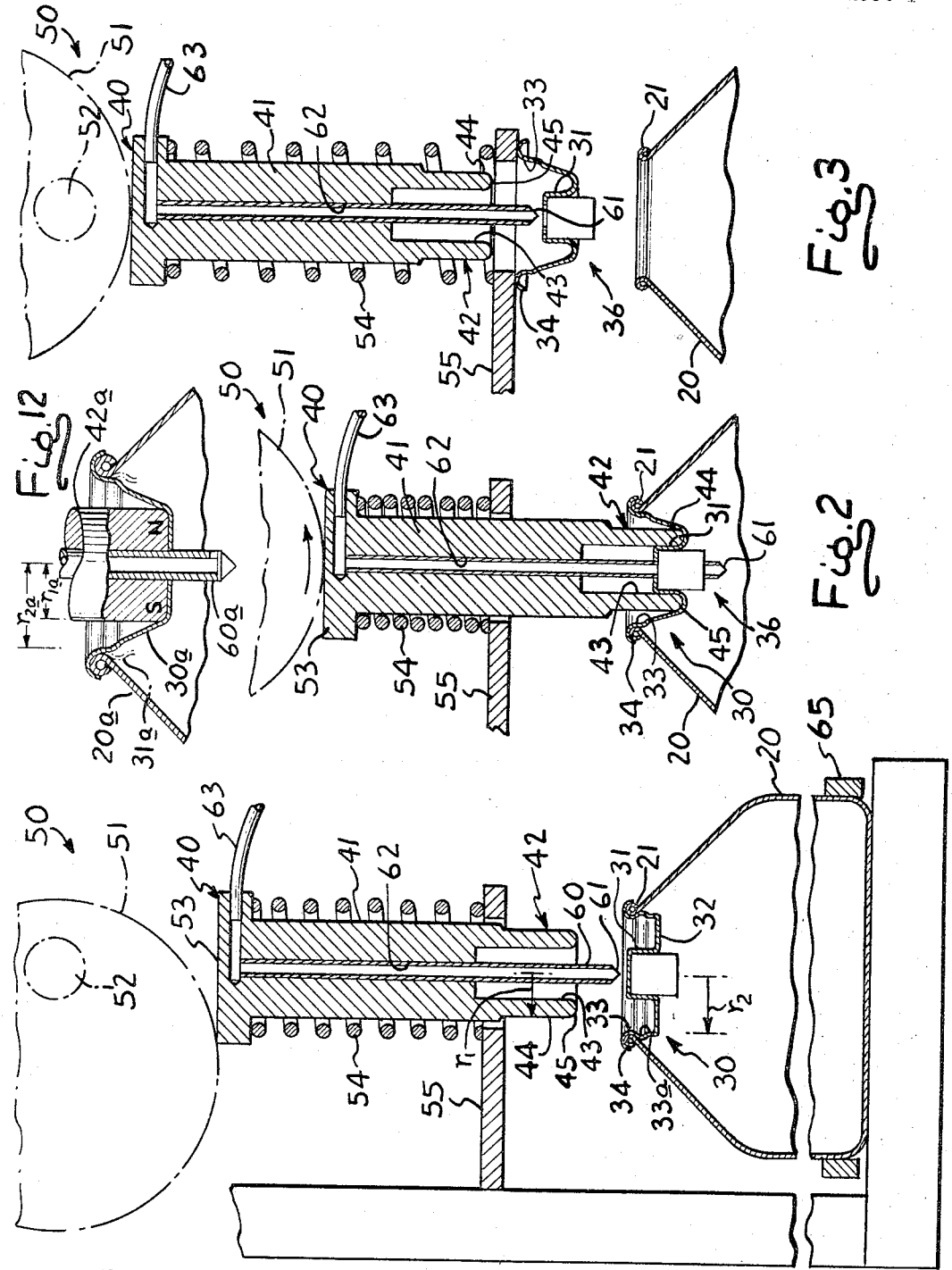

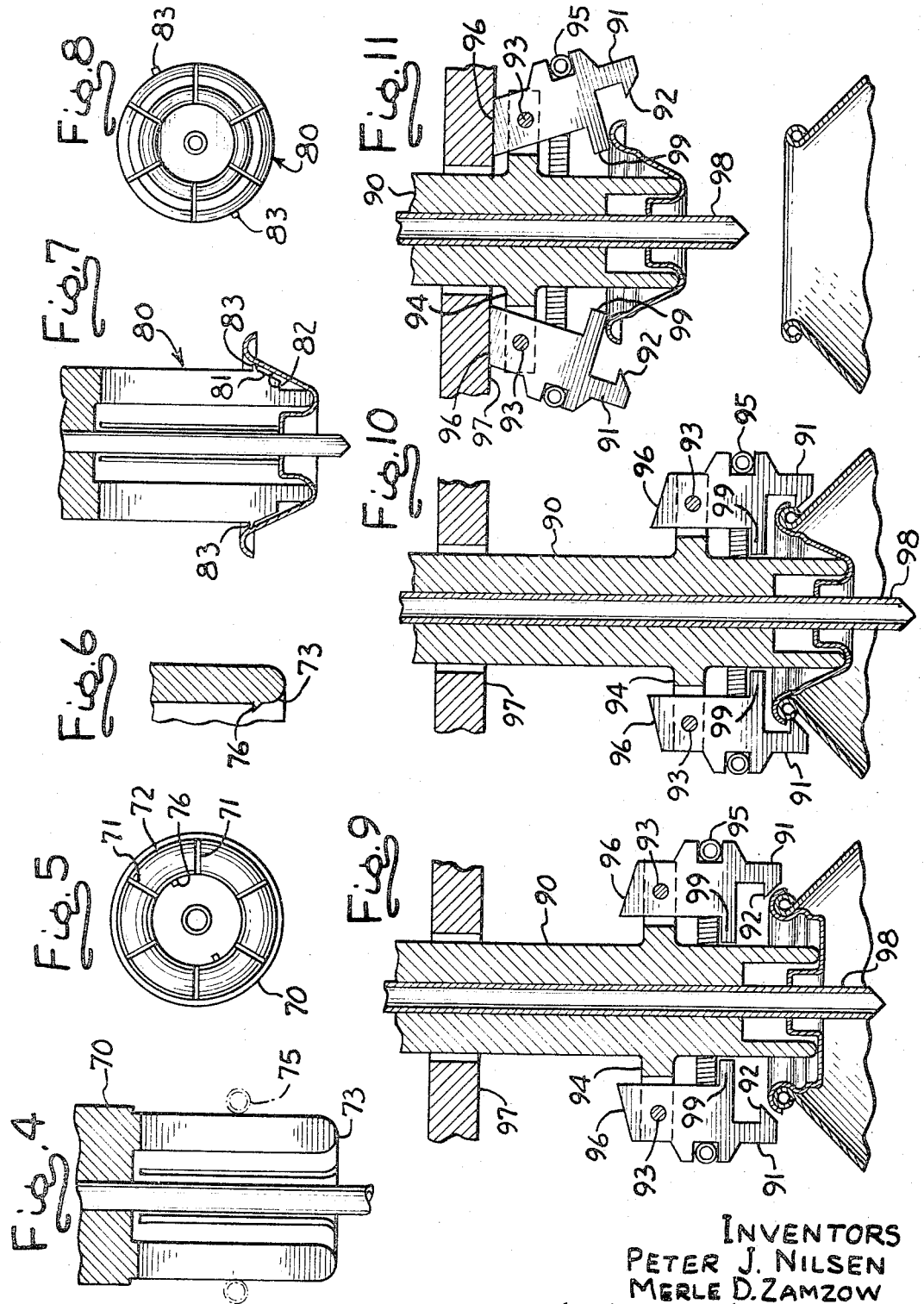

3,346,943
PROCEDURE AND APPARATUS FOR REMOVING VALVE ASSEMBLY FROM PRESSURIZED CONTAINER
Peter J. Nilsen and Merle D. Zamzow, Haines City, Fla., assignors to Nilsen Mfg. Co., Haines City, Fla., a corporation of Florida
Filed July 12, 1965, Ser. No. 471,349
12 Claims. (Cl. 29—213)

ABSTRACT OF THE DISCLOSURE

The valve assembly which is removed from a container by the disclosed apparatus is normally held in place by a lip curling around the upper edge of the container. A reciprocating tool traveling into and out of the container abuts against the valve assembly and deforms it into a frustoconical shape, uncurling the locking lip and permitting removal of the valve assembly from the container.

---

The present invention relates to pressurized containers and more particularly to the processing of used containers for whipped cream or the like to permit reuse.

Various materials including whipped cream are sold in pressurized cylindrical cans or containers having a valve assembly at the top for dispensing individual portions under manual control. The container is considered expendable and is thrown away when empty. Restaurants, drug stores and the like have found it more economical to purchase whipped cream in reusable containers of heavier construction, with the empties being sent back to the processor, often a dairy, for recharging. Reusable containers have commonly taken the form disclosed in P. J. Nilsen Patent 2,580,188 which issued on December 24, 1951. Such containers have a relatively large and heavy cover with a bayonet type locking arrangement, a reusable rubber gasket, and reusable flap valve. Upon arrival at the processor the disassembly and cleaning of all of the parts and subsequent recharging of the contents must be performed manually.

It is an object of the present invention to provide a procedure and apparatus for making the refilling of containers for whipped cream and the like more economical than has been possible using existing procedures. It is another object to provide means for processing an empty whipped cream container or the like which avoids necessity for any hand operations and which permits disassembly, cleaning, and recharging to be accomplished automatically on a production line basis.

It is more specifically an object of the present invention to provide a tool for removing the valve assembly from an empty, but reusable, cream container to facilitate cleaning by mechanical means and for replacement by an entirely new valve assembly incident to recharging. It is another specific object to provide a procedure which makes use of a reusable container, and which takes full advantage of the economies of re-use, but which nevertheless permits use of a common, low cost throw-away valve assembly and the same automatic high speed equipment which has been developed for applying such valves to cans of the throw-away type in the past.

It is an even more specific object of the present invention to provide a tool for removing throw-away valves from reusable pressure containers which is extremely simple in construction and operation and which requires only a single downward thrust to disengage the pressurized joint between the valve assembly and the reusable container. It is also an object to provide a valve-removing tool and procedure which, in spite of its simplicity, is positive in operation and which therefore can be used with complete reliability in high speed cleaning and recharging apparatus. It is an object, in one of the more detailed aspects, to achieve automatic venting of the container incident to, and just prior to, the removal of the valve assembly.

It is yet another object of the present invention to provide a simple means for disengaging a pressurized joint on a reusable container but which does not affect the container itself and which particularly preserves the integrity of the sealing surfaces on the container so that the container may be used an unlimited number of times without any loss of efficiency. In one of its aspects it is an object of the invention to provide a valve-removing tool and procedure which makes use of the ductile characteristics of the metal conventionally employed in valve assemblies for throw-away type containers to facilitate removal on the retraction stroke of the tool for easy disposal prior to a subsequent cycle of operation, permitting extremely high cyclic rates.

Other objects and advantages of the invention will become apparent upon reading the attached detailed description and upon reference to the drawings in which:

FIG. 1 is a vertical section partly diagrammatic of a reusable container having an expendable valve assembly and a tool, constructed in accordance with the invention, for removing such assembly.

FIG. 2 is a stop motion view showing the deformation and disengagement which occurs during the downward thrust of the tool.

FIG. 3 is a stop motion view showing the stripping of the discarded valve assembly from the tool during the upward stroke.

FIG. 4 is a fragmentary axial section, somewhat enlarged, taken through the end portion of a removing tool of modified construction.

FIG. 5 is a lower end view of the construction shown in FIG. 4.

FIG. 6 is a fragment showing the tip of one of the fingers of the construction of FIG. 4 equipped with a metal-engaging projection.

FIG. 7 is a fragmentary axial section taken through the end portion of a removing tool showing a still further modification.

FIG. 8 is a lower end view of the construction shown in FIG. 7.

FIG. 9 is a vertical section taken through a modified form of the device utilizing curl-engaging fingers.

FIG. 10 is a stop motion view showing the positions of the parts at the end of the power stroke.

FIG. 11 is a stop motion view showing disengagement of the discarded valve assembly at the end of the retraction stroke.

FIG. 12 is a fragmentary view of a modified form of the present invention utilizing a simple punching tool for elongation and removal of the valve assembly.

While the invention has been described in connection with certain preferred embodiments, it will be understood by one skilled in the art that we do not intend to be limited to the particular embodiments shown but intend to cover the various alternative and equivalent constructions falling within the spirit and scope of the appended claims.

Turning to the drawings there is shown in FIGURE 1 a reusable container 20 which may be formed of stainless steel or the like in sufficiently heavy gauge as to withstand repeated and rough usage. Surrounding the mouth of the container at its upper end is a smooth circular bead or lip 21 formed by curling the upper edge of the container. The means employed for achieving the lip 21 are not within the scope of the present invention and reference is made to the patent literature. Secured to the lip 21 is a valve assembly 30 of the type in common usage with containers of the throw-away type. To understand the present invention it will be helpful to identify significant portions of the valve assembly. The assembly, generally speaking is of annular cup shape having an inner wall 31, a bottom 32, and and outer wall 33, the outer wall terminating in a peripheral curl or flange 34 which is curled at least partially about the lip 21. To lock the assembly in place and to create a pressure-sealed joint, the outer wall 33 of the valve assembly is deformed outwardly into a shallow bead or crimp 33a which underlies the inner edge of the lip 21. Alternatively, the curl 34 may extend around the lip 21 more than half way so that it underlies the lip to resist internal pressure. The tools and procedures to be discussed are usable with either type of sealed joint.

In accordance with the present invention a valve removing tool is provided in the form a relatively reciprocated plunger, the presented ends of which has a diameter substantially less than the diameter of the outer wall of the valve assembly for pressing on the center portion of the valve assembly to deform the bottom and side wall of the valve assembly into frustoconical shape disengaging the locking surfaces and reducing the average radial dimension sufficiently to permit the discarded valve assembly to be readily lifted from the container. More specifically a plunger is used having a hollow annular end portion with a rounded tip for pressing against the central portion of the bottom 32 of the valve assembly. Moreover, means are provided on, or coupled to, the plunger for gripping or engaging the discarded valve assembly so that it is lifted clear when the plunger undergoes its return stroke. Thus we provide a tool 40 having a plunger 41, the lower end 42 of which is formed into hollow annular shape to define an inner surface 43, an outer surface 44, and a presented tip 45. The radius $r_1$ of the outer surface of the tool is, in the preferred embodiment, substantially less than the radius $r_2$ of the outer wall of the valve assembly.

Any suitable driving means 50 may be used reciprocate the plunger; for example, the downward thrust may be obtained by using a cam 51 mounted on a shaft 52 and bearing against a cam follower surface 53 on the upper end of the plunger. The return stroke may be achieved by a stiff spring 54 interposed between the plunger and a vertical guide member 55 in which the plunger is slidable. It will be understood that the driving means 50 is simply exemplary and that more refined arrangements may be used without departing from the present invention.

In accordance with one of the aspects of the present invention the surfaces of the plunger may be tailored to frictionally engage an opposing surface on the valve assembly so that the valve assembly is removed for disposal when the plunger is retracted. This can be simply accomplished by dimensioning the inner surface 43 of the plunger so that it has a slight interfering fit with respect to the inner wall 31 on the valve assembly. The forces developed during the power stroke are sufficient to overcome the interfering fit and to permit the tip of the plunger to seat on the bottom wall 32.

Prior to discussing a typical operating cycle, it is a further feature of the present invention that a hollow lance is provided, axially centered in the plunger, for piercing the center of the valve assembly for venting any residual pressure within the container just prior to the deformation and removal of the discarded assembly. Thus we provide a lance 60 which may be made of hardened steel tubing having a sharpened tip 61 and seated in a central bore 62 in the plunger, the upper end of the lance being connected to a suitable venting tube 63.

In operation, rotation of the cam 50 causes the plunger 41 to be thrust downwardly so that the lance 60 penetrates the central portion of the valve assembly relieving any internal pressure and following which the tip 45 of the plunger engages the bottom wall 32 of the valve assembly. As the bottom of the stroke is approached, the bottom wall 32 and the outer wall 33 are deformed or stretched into the configuration shown in FIG. 2. Where a tool is used dimensioned about as shown, the deformation involves removal of the internal bead 33a which normally underlies the lip of the container and the reduction in the average radius of the assembly so that there is no longer any interfering portion or projection on the assembly which would inhibit its removal from the container. Stated in other words, the action of a tool is to elongate the annular cup shape of the valve assembly which is accompanied by the "necking down" or the "drawing" of the cup from its original, generally cylindrical, shape to frustoconical shape in which the average diameter is substantially less than the diameter of the lip or neck opening, removing any obstruction to easy removal. It should be particularly noted that the reduction in average diameter permits bodily removal of the valve assembly without requiring that the bead or crimp 33a be completely removed. This is of particular advantage where it is desired to minimize the thrust required to do the job in the face of a sharp or deep crimp and with metals having relatively poor ductility.

After the downward limit of movement of the plunger is passed, the plunger begins its upward stroke. The plunger may be drawn upwardly in a positive fashion by a suitable linkage or reliance may be placed upon a stiff return spring such as that shown at 54. In any event, the friction between the inside of the plunger and the inner wall of the valve assembly is sufficient so that the valve assembly is carried upwardly with the plunger to a point clear of the container. Any suitable clamping means as jaws 65 (FIG. 1) may be used to hold the container seated during retraction.

In accordance with a still further feature of the invention means are provided for removing the valve assembly from the end of the plunger as the latter approaches the top of its retraction stroke. In its simplest aspect such removing means may be the guide plate 55 previously referred to which, by its obstruction of upward movement, enables the plunger and the lance carried by the plunger to be completely withdrawn. If an indexing carrier is provided for the containers, the discarded valve assembly may simply be allowed to fall clear into a suitable receptacle, or, if desired, and as will be apparent to one skilled in the art, any suitable arm or sweeper may be mechanically coupled to the plunger so as to sweep laterally at the time that the discarded assembly is stripped so that the assembly is deposited in a suitable receiver to one side of the path of movement of the containers.

While the invention has been described in connection with the removal or the defeating of a retaining crimp in the outer wall of the valve assembly, the valve removing tool is equally effective where the curl itself is utilized to hold the valve assembly captive on the container. The stroke of the plunger is simply adjusted to produce the proper degree of uncurling i.e. uncurling to the point where the edge of the curl is drawn at least half way up on the outer edge of the container lip so that there is no longer any obstruction to the retracting movement. Indeed, the removing tool is particularly effective where both a captive curl and crimp are used to maintain the valve assembly locked to the neck of a container in the face of high internal pressure.

While operation of the tool is not at all critically dependent upon the amount of interfering fit between the inner surface of the plunger and the inner wall of the assembly, nevertheless we contemplate a variation in the structure to still further increase the reliability of gripping where variation in the diameter of the inner wall of the valve assembly is anticipated. Thus, as shown in FIGS. 4 and 5, it is proposed that the lower end 70 of the plunger be radially slotted as indicated at 71 to form a series of parallel fingers 72. This provides sufficient resilience, even when ordinary types of steel are employed in the tool, so that reliable gripping will be achieved. The rounded inside edge 73 on each of the fingers serves to cam the parts into engagement with one another. The spring rate of the fingers may be decreased by appropriate reduction in section or increased if desired, by use of one or more encircling garter springs 75 as shown in dot-dash outline. If it is desired to enhance the gripping action even more, the inside surfaces of the fingers may be knurled or roughened or, alternatively, at least one of the fingers may be provided with an inwardly projecting prong as indicated at 76 in FIG. 6. When such a projection is employed it is desirable for the plunger to be positively retracted so as to insure reliable stripping.

While the invention has been described above in connection with a gripping at the inner surface of the tool the invention is not limited thereto and if desired the parts may be dimensioned so that the gripping engagement, for retraction, occurs between the outside surface of the tool and the outer wall of the valve assembly. Thus, referring to FIGS. 7 and 8, the end of the plunger indicated at 80 may have an outer surface 81 which is dimensioned to engage the wall 82 of the valve assembly and, if desired, prongs 83 may be provided on the surface 81 to insure engagement not withstanding the fact that the wall 82 may assume a frustoconical section. It is desirable to use the tool configuration shown in FIGS. 7 and 8 where the containers have a standard neck diameter but where there are relatively wide variations in the valve portion of the assembly which may occur, for example, where the valve assemblies are produced by a number of different manufacturers for use on standard containers. The two embodiments described above have in common the feature that gripping occurs directly between the end of the tool and a cooperating surface on the valve assembly. However, it is also contemplated that separate gripping fingers may be used which are movable with the tool or plunger but which are dimensioned to engage the curl on the assembly at the bottom of the power stroke. Thus referring to FIGS. 9, 10, and 11 the plunger indicated at 90 is provided with two or more fingers 91 equidistantly spaced and having hooks 92 at their lower ends. Such fingers are mounted for limited swinging movement for example, by mounting each of them on a pin 93 at the upper end supported in a suitable laterally extending bracket 94 which may, if desired, be integral with the plunger. Bias is provided by a garter spring 95.

In operation the power thrust not only deforms the valve assembly into the frustoconical shape as shown in FIG. 10 but the fingers are moved slightly beyond the edge of the curl engaging the edge so that the valve assembly is positively lifted during the retraction period. It is one of the features of the embodiment under discussion that upon reaching the end of the retraction stroke each of the fingers 91 is cammed outwardly to disengage the captured valve assembly. Thus, referring to FIG. 11, each of the fingers 91 has an angled upper surface 96 thereon which engages the underside of the guide plate 97 so that each of the fingers rocks outwardly at the same time. The valve assembly during such outward rocking movement is kept in centered position by the tip of the plunger so that only a small amount of movement of each of the fingers is sufficient for disengagement of the curl. If desired a projection 99 (FIG. 11) may be provided on each of the fingers for engaging the curl of the valve assembly to exert a downward thrust as the fingers 91 are rocked backwardly. If a tapered lance is used the removed valve assembly will then be free to drop clear. Alternatively, the lance 98 may be slidably mounted in the tool and retracted upwardly to free the valve assembly.

While the invention has been described in connection with a preferred embodiment in which the end of the tool is of annular section for engaging the annular bottom wall of the valve assembly, it will be apparent to one skilled in the art that the invention in its broader aspects is not limited to a tool of annular configuration and, if desired, the deformation into frustoconical shape may be achieved by a tool in the form of a simple plunger or punch which has a diameter substantially less than the diameter of the outer wall of the valve assembly and which presses against the center portion of the valve assembly. Use of such a punch is particularly suited to removal of "blind" closures i.e. closures which do not have an integral valve and intended for use with a separate discharge valve. Thus referring to FIG. 12 there is shown a container 20a having a blind closure 30a having an original form 31a, indicated by the dot-dash outline, which is the same as the valve assemblies discussed above. Pressed against the center portion of the closure is a plunger having an end portion 42a which is not provided with any internal clearance opening but which may, if desired, include a lance 60a for relief of internal pressure. As shown the radius $r_{1a}$ of the tool is substantially less than the radius $r_{2a}$ of the outer wall of the closure so that when the tool is thrust downwardly the closure is deformed into the illustrated frustoconical shape thus freeing it for removal on the retraction stroke. Conveniently, the end of the tool may be permanently magnetized as indicated by the poles "S" and "N" causing the closure to cling to the tool during upward movement. The stripping means may be the same as used in the earlier described embodiment. The present invention also contemplates the use of a solid or punch-like tool for removal of valve assemblies. Thus where the plunger 42a is used with a valve assembly rather than with a blind closure, the central, upstanding portion thereof is simply crushed more or less flat during the initial portion of the engagement followed by, or accompanied by, the stretching of the metal into the previously mentioned frustoconical shape.

Although the invention has been described in connection with reusable whipped cream dispensers, it will be apparent that the invention is not limited to such dispensers and is applicable wherever it is desired to reuse a pressure type container with a succession of low cost disposable valves. In this way the container may be opened, cleaned, and recharged entirely by mechanical apparatus and with the only portion to be cleaned being the smooth and easily accessible inner surface of the container itself. Since the valve portion of the device is renewed for each usage, a high degree of valve reliability is assured. Moreover, since the lip surface which supports the valve assembly is in no way affected by removal of the valve and since such surface is protected by the curl of the valve assembly during use, the surface retains its pressure tight integrity regardless of the number of trips which the container may make. In short, the present procedure and apparatus for removing a discarded valve enables both the dairy and the user to have the benefits which are inherent in expendable valves and the economies which are inherent in re-use.

In the following claims the term "lateral deformation" shall be deemed to include the change in shape which takes place in either the outer wall of the valve assembly, or the curl thereof, or both, as a result of bottoming the annular removing tool on the bottom wall of the assembly. The term "annular" includes any surface in annular locus whether continuous or discontinuous. While use of a relatively soft, ductile steel is assumed, other metals may of course be used. The term "valve assembly" shall be understood to include blind closures and the term "lift" where used to denote movement of the valve assembly shall be understood to mean moving it out of the container and is not to be understood as necessarily indicating an upward movement.

What is claimed is:

1. For use in removing from a pressure container a valve assembly of annular cup shape having a cylindrical inner wall, bottom, and cylindrical outer wall terminating in a peripheral curl, a valve removing tool including a plunger having a hollow annular end portion defining an inner surface and an outed surface and engaging tip, means for reciprocating the tool axially of the container so that upon engagement of the bottom of the valve assembly by the tip during the inward stroke the bottom is pressed inwardly of the container producing lateral inward deformation of the outer wall, said plunger having means connected thereto for engaging the valve assembly incident to completing the inward stroke so that upon retraction of the plunger the valve assembly is lifted off of the container, and means for removing the valve assembly from the plunger incident to completing the retraction stroke.

2. For use in removing from a pressure container a valve assembly of annular cup shape having a cylindrical inner wall, bottom, and cylindrical outer wall terminating in a peripheral curl, a valve removing tool comprising in combination a plunger having a hollow annular end portion defining an inner surface and an outer surface and engaging tip, means for reciprocating the tool axially of the container so that the tip of the plunger deformingly engages and axially displaces the bottom of the valve assembly during its inward stroke, the outer surface of the plunger having a diameter which is substantially less than the diameter of the outer wall of the valve assembly so that the outer wall is deformed into frustoconical section permitting retraction of the retraction valve assembly free of interference incident to the return stroke of the plunger, and means for engaging the valve assembly to lift it from the container.

3. For use in removing from a pressure container a valve assembly of annular cup shape having a cylindrical inner wall, bottom, and cylindrical outer wall crimped to the container, a valve removing tool comprising in combination a plunger having a hollow annular end portion defining an inner surface, an outer surface and engaging tip extending between the surfaces, means for reciprocating the plunger axially of the container so that the tip thereof deformingly engages and axially displaces the bottom of the valve assembly during the inward stroke thereof the inner diameter of the plunger being sufficient to clear the inner cylindrical wall of the valve assembly and the outer diameter of the plunger being substantially less than the diameter of the outer wall of the valve assembly so that the deforming movement of the plunger causes elongation of the valve assembly accompanied by the stretching of the outer wall thereof to substantially remove the crimp and to deform the outer wall from its normal cylindrical shape to frustoconical section thereby freeing the valve assembly from any obstruction to the endwise removal thereof, and means for engaging the freed valve assembly to lift it from the container.

4. For use in removing from a pressure container a valve assembly of annular cup shape having a cylindrical inner wall, bottom, and cylindrical outer wall terminating in a peripheral curl, a valve removing tool including a plunger having a hollow annular end portion defining an inner surface and an outer surface and engaging tip, a hollow lance in said plunger and extending axially beyond the tip thereof, means for reciprocating the plunger axially of the container so that the lance penetrates the center of the valve assembly to relieve pressure in the container followed by engagement of the bottom of the valve assembly by the plunger tip so that the valve assembly is pressed inwardly of the container accompanied by a reduction in the average diameter of the outer wall, said plunger having means connected thereto for engaging the valve assembly incident to completing the inward stroke so that upon retraction of the plunger the valve assembly is lifted off of the container, and means for removing the valve assembly from the plunger incident to completing the retraction stroke.

5. For use in removing rfom a pressure container a valve assembly of annular cup shape having a cylindrical inner wall, bottom, and cylindrical outer wall terminating in a peripheral curl, a valve removing tool including a plunger having a hollow annular end portion defining an inner surface, an outer surface and engaging tip extending between the surfaces, means for reciprocating the plunger axially of the container so that upon engagement of the bottom of the valve assembly by the tip during the inward stroke the bottom is pressed inwardly of the container deformably stretching the outer wall into lesser average diameted, at least one of the surfaces on the tool being dimensioned to retentively engage the associated wall of the valve assembly so that upon retraction of the plunger the valve assembly is lifted off of the container, and means for removing the valve assembly from the plunger incident to completing the retraction stroke.

6. For use in removing from a pressure container a valve assembly of annular cup shape having a cylindrical inner wall, bottom, and cylindrical outer wall terminating in a peripheral curl, a valve removing tool including a plunger having a hollow annular end portion defining an inner surface and engaging tip, means for reciprocating the plunger axially of the container so that upon engagement of the bottom of the valve assembly by the tip the bottom of the assembly is pressed inwardly of the container deformably stretching the outer wall of the assembly into frustoconical shape and freeing the assembly for removal, the inner surface of the plunger being dimensioned to frictionally engage the cylindrical inner wall of the valve assembly so that upon retraction of the plunger the valve assembly is lifted off of the container, and means for stripping the valve assembly from the plunger incident to completing the retraction stroke.

7. For use in removing from a pressure container a valve assembly of annular cup shape having an inner wall, bottom, and cylindrical outer wall terminating in a peripheral curl, a valve removing tool including a plunger having a hollow annular end portion defining an inner surface and engaging tip, means for reciprocating the plunger axially of the container so that upon engagement of the bottom of the valve assembly by the tip the bottom of the assembly is pressed inwardly of the container deforming the outer wall thereof into frustoconical shape, the end portion of the plunger being formed of parallel fingers resiliently biased inwardly into frictional engagement with the inner wall of the valve assembly so that upon retraction of the plunger the valve assembly is lifted off of the container, and means for stripping off the valve assembly from the plunger incident to completing the retraction stroke.

8. For use in removing from a pressure container a valve assembly of annular cup shape having a cylindrical inner wall, bottom, and cylindrical outer wall terminating in a peripheral curl, a valve removing tool including a plunger having a hollow annular end portion defining an inner surface and an outer surface and engaging tip, means for reciprocating the plunger axially of the container so that upon engagement of the bottom of the valve assembly by the tip during the power stroke the bottom of the assembly is pressed inwardly of the container deforming the outer wall into frustoconical shape, at least one of the surfaces on the tool having a lateral projection for retentively engaging the associated wall of the valve assembly so that upon retraction of the plunger the valve assembly is lifted off of the container, and means for stripping off the valve assembly from the plunger incident to completing the retraction stroke.

9. For use in removing from a pressure container a valve assembly of annular cup shape having a cylindrical inner wall, bottom, and cylindrical outer wall terminating in a peripheral curl engaging a bead on the container, a valve removing tool including a plunger, means for reciprocating the plunger axially of the container so that upon engagement of the bottom of the valve assembly by the plunger during the power stroke the bottom of the assembly is pressed inwardly of the container deforming the outer wall of the valve assembly and freeing it for removal, and means connected to the plunger for engaging the edge of the curl incident to completing the inward stroke so that upon retraction of the plunger the valve assembly is lifted off of the container.

10. For use in removing from a pressure container a valve assembly of annular cup shape having a cylindrical inner wall, bottom, and cylindrical outer wall terminating in a peripheral curl engaging a bead of the container, a valve removing tool including a plunger, means for reciprocating the plunger axially of the container so that upon engagement of the bottom of the valve assembly by the plunger during the power stroke the bottom of the assembly is pressed inwardly of the container deforming the outer wall of the valve assembly and free it for removal, said plunger having secured thereto a pluraltiy of peripherally spaced inwardly projecting fingers dimensioned to engage the exposed edge of the curl at the end of the inward stroke and so that upon retraction of the plunger the valve assembly is lifted off of the container, and means for releasing the fingers from the valve assembly incident to completion of the retraction stroke.

11. For use in removing from a pressure container a valve assembly of annular shape having a cylindrical outer wall crimped to the container, a valve removing tool comprising in combination a plunger having an outer surface and an annular engaging tip, means for reciprocating the plunger axially of the container with sufficient force and amplitude so that its tip engages the center portion of the valve assembly and axially deforms it during the inward stroke, the outer surface of the plunger having a diameter which is substantially less than the diameter of the outer wall of the valve assembly so that engagement of the plunger causes elongation of the valve assembly accompanied by the stretching of the outer wall thereof to deform the outer wall from its normal cylindrical shape to frustoconical section substantially removing the crimp and thereby freeing the valve assembly from any obstruction to the endwise removal thereof, and means for removing the freed valve assembly from the container.

12. For use in removing from a pressure container, a valve assembly of annular shape, having a symmetrical outer wall crimped to the container, a valve removing tool comprising in combination a plunger having a substantially right cylindrical outer surface and an engaging tip, and means for reciprocating the plunger into and out of the container so that the center of the valve assembly is pressed inwardly of the container by the tip during its inward stroke, the outer surface of the plunger having a diameter which is substantially less than the diameter of the outer wall of the valve assembly so that it is elongated by said plunger and said outer wall is stretched until it is deformed from its normal cylindrical shape to frustoconical section substantially removing the crimp and freeing the valve assembly from any obstruction to its removal from the container.

References Cited
UNITED STATES PATENTS

| | | | |
|---|---|---|---|
| 1,506,886 | 9/1924 | Clay | 29—282 X |
| 2,060,888 | 11/1936 | Newman. | |
| 2,470,891 | 5/1949 | Hammers | 7—1 X |
| 2,697,872 | 12/1954 | Armstrong | 29—282 X |
| 2,950,525 | 8/1960 | Duncan et al. | 29—282 X |
| 2,973,021 | 2/1961 | Crossen | 7—1 X |
| 3,101,688 | 8/1963 | Negola et al. | 25—200 |

WILLIAM FELDMAN, *Primary Examiner.*

J. C. PETERS, *Assistant Examiner.*